(No Model.)

J. M. BAKER.
MACHINE FOR EMBOSSING LEATHER, PAPER, &c.

No. 366,755. Patented July 19, 1887.

Witnesses.

Inventor.
J. M. Baker
by J. H. Adams
Attorney.

N. PETERS. Photo-Lithographer. Washington, D.C.

UNITED STATES PATENT OFFICE.

JACOB M. BAKER, OF BOSTON, MASSACHUSETTS, ASSIGNOR, BY MESNE ASSIGNMENTS, TO THE AMERICAN DECORATIVE COMPANY, OF MAINE.

MACHINE FOR EMBOSSING LEATHER, PAPER, &c.

SPECIFICATION forming part of Letters Patent No. 366,755, dated July 19, 1887.

Application filed April 30, 1886. Serial No. 200,617. (No model.)

*To all whom it may concern:*

Be it known that I, JACOB M. BAKER, a citizen of the United States, residing at Boston, in the county of Suffolk and State of Massachusetts, have invented a new and useful Improvement in Embossing-Machines, of which the following is a specification.

My invention relates to an improvement in machines for embossing or producing impressions in relief on any suitable material—such as leather, paper, or wood fiber in sheets or rolls; and the invention consists in the employment of a metal roller having any desired design or ornamental configuration cut or engraved on its periphery in cameo or intaglio, in combination with another roller having a coating of plastic material capable of receiving an impression from the engraved roller, and which, after it has been hardened, will be the exact counterpart of the engraved roller. When only a slight relief is required, one of the rollers is covered with soft rubber or other suitable elastic material.

The invention is particularly adapted to produce the embossed wall-covering from the material described in the Patent No. 331,469, granted to me December 1, 1885.

Figure 2:
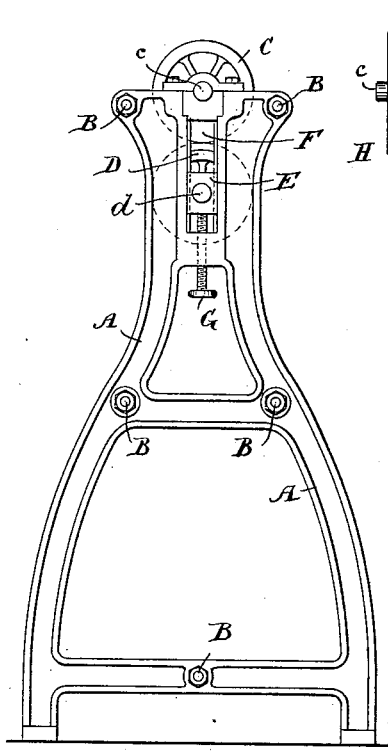
Figure 1:
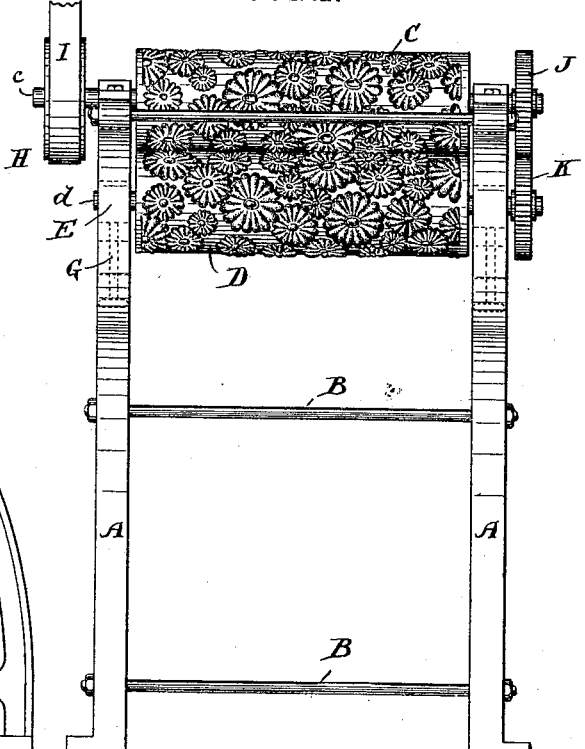
Figure 3:
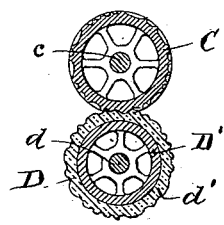
Figure 4:
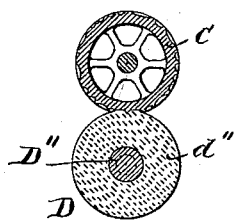

Referring to the accompanying drawings, Figure 1 is a front elevation of a machine embodying my invention. Fig. 2 is an end or side view of the same. Fig. 3 is a section through the rollers. Fig. 4 is a section through a pair of rollers, one of which is of rubber or other suitable analogous material.

A A are the sides of the frame, and secured together by the bolts B B.

C D are the embossing-rollers. The shaft $d$ of the lower roller, D, is mounted in bearings E, which are adjustable vertically in a slot, F, in the side frames, A, and are held in position by screws G. The shaft $c$ of the upper roller, C, is journaled in bearings in the upper part of the side frames. On one end of the shaft $c$ is a pulley, H, which is driven from any suitable power by a belt, I. Motion is transmitted from shaft $c$ to shaft $d$ by means of cog-wheels J K, mounted upon said shafts, and so arranged as to cause the rollers C D to revolve at the same rate of speed.

The roller C, which is of metal or composition, is cut or engraved with any desired design, either in cameo or intaglio, and the opposite roller is composed of a metal core, D', coated with some suitable plastic material, $d'$, Fig. 3, which is to be applied in a warm and moist state, and before the plastic material has become hardened the rollers are rotated and the design upon the roller C is transferred to the plastic material of the opposite roller, either in cameo or intaglio, which, when it becomes dry and hardened, will form an exact counterpart of the design on the engraved metal roll—an effect which cannot be produced with so much exactness by the ordinary process of engraving. The rolls thus formed being adjusted to rotate in juxtaposition with the metal rolls, the required embossed design is produced on the fabric, which, when dampened, is passed between the two rolls thus constructed and arranged.

The plastic material which I prefer to use for coating the roll D is composed of about one and one-half pound of fine sawdust, one pound of pulverized bone-charcoal, one-fourth pound of rosin, one and one-half pound of shellac, one and one-half pound of pulverized brick-clay, with sufficient asphaltum to enable the mass to be easily worked and to adhere to the roll when applied.

I do not confine myself to the use of the above-named composition in the exact proportions named, nor to any particular plastic material for covering the secondary roll, but intend using any suitable plastic substance which can be applied in a softened state and before hardening is capable of securing and retaining the required impression from the metal roll, and which when hardened will be sufficiently strong to use in conjunction with a metal roll for the purpose of embossing.

When a high relief is not required, I use in connection with the engraved metal roll a roll, D'', covered with a thick coating of soft rubber, $d''$, or any other suitable elastic substance—such as a mixture of rubber and cork—which, when rotated in conjunction with the engraved metal roll, will cause the design on the metal roll to be impressed upon the fabric to be embossed.

The metal roll having the engraved design, as it rotates in conjunction with the elastic roll, forces the material to be embossed against the elastic roll, and the required impression will be imparted to the material as it passes between the two rolls, and unless a very high relief is desired to be produced it is as effective as though the design were engraved on two metal rolls.

What I claim as my invention, and desire to secure by Letters Patent, is—

1. The method, substantially as herein set forth, of producing an embossing-roll which shall be the exact counterpart of a cut or engraved roll, the same consisting in covering a plain roll with a plastic material applied in a warm or moist state, then rotating the said roll in contact with a cut or engraved roll, so that the design or configuration thereon will be imparted to the plastic material, after which it is left to harden.

2. In an embossing-machine, the combination of a cut or engraved metal roll with a roll having a covering of plastic material, to which the design from the cut or engraved roll has been imparted, substantially as shown and described.

3. In an embossing-machine, the combination of a cut or engraved roll with a roll having a covering or surface of an elastic material, whereby as a fabric is passed between the said rolls the impression on the cut or engraved roll will be imparted to the fabric.

In testimony whereof I have signed my name to this specification in the presence of two subscribing witnesses.

JACOB M. BAKER.

Witnesses:
J. H. ADAMS,
E. PLANTA.